Feb. 21, 1956 W. F. WANNER ET AL 2,735,199
ROTARY SNOW PLOW
Filed Sept. 18, 1952 5 Sheets-Sheet 2
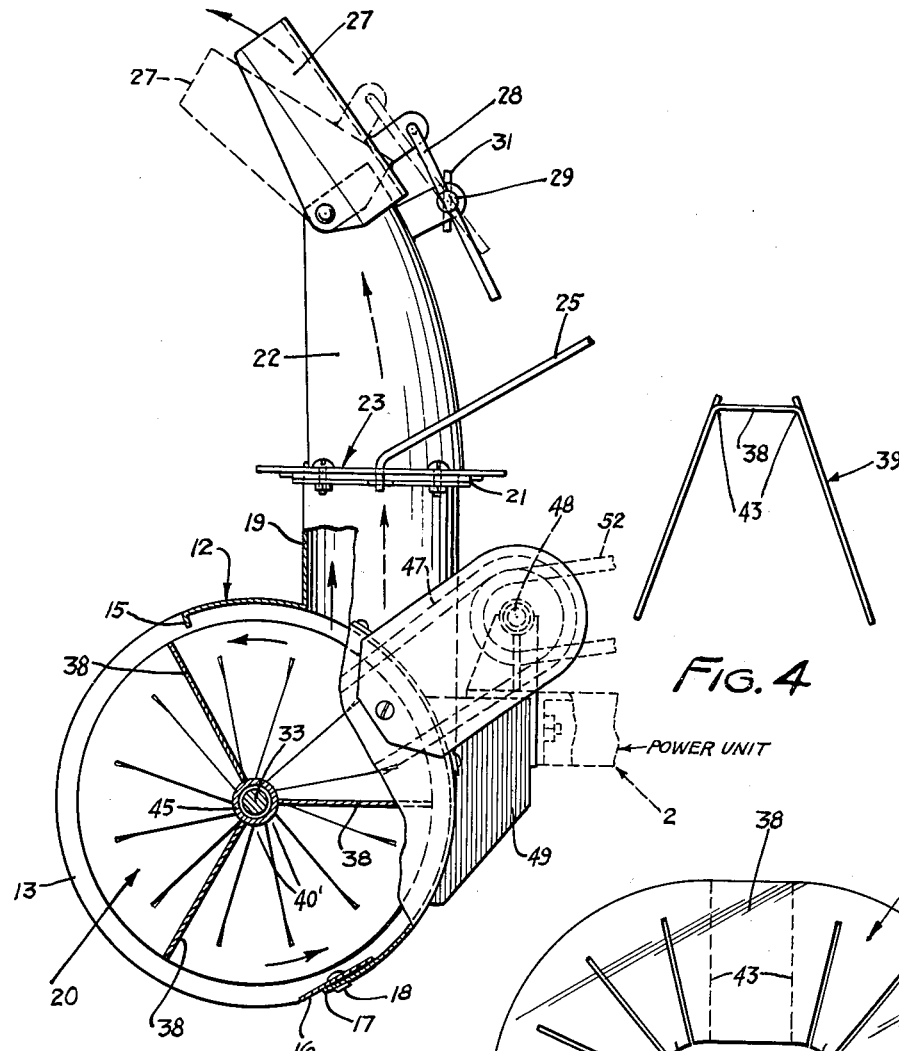
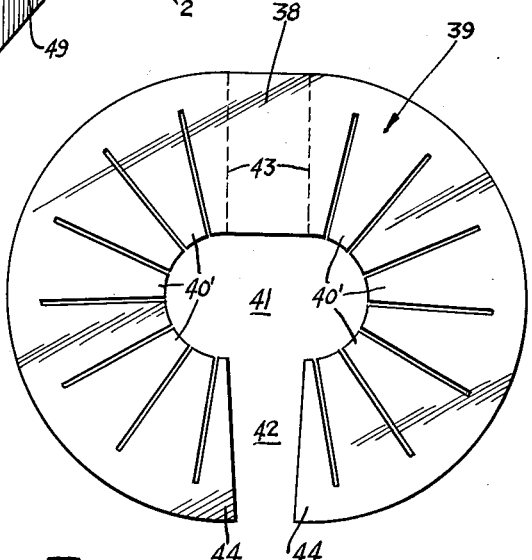
INVENTORS
WILLIAM F. WANNER
BY ARCHIE O. WILLIAMSON
DUDLEY O. HALL
ATTORNEYS Feb. 21, 1956  W. F. WANNER ET AL  2,735,199
ROTARY SNOW PLOW Filed Sept. 18, 1952  5 Sheets-Sheet 3

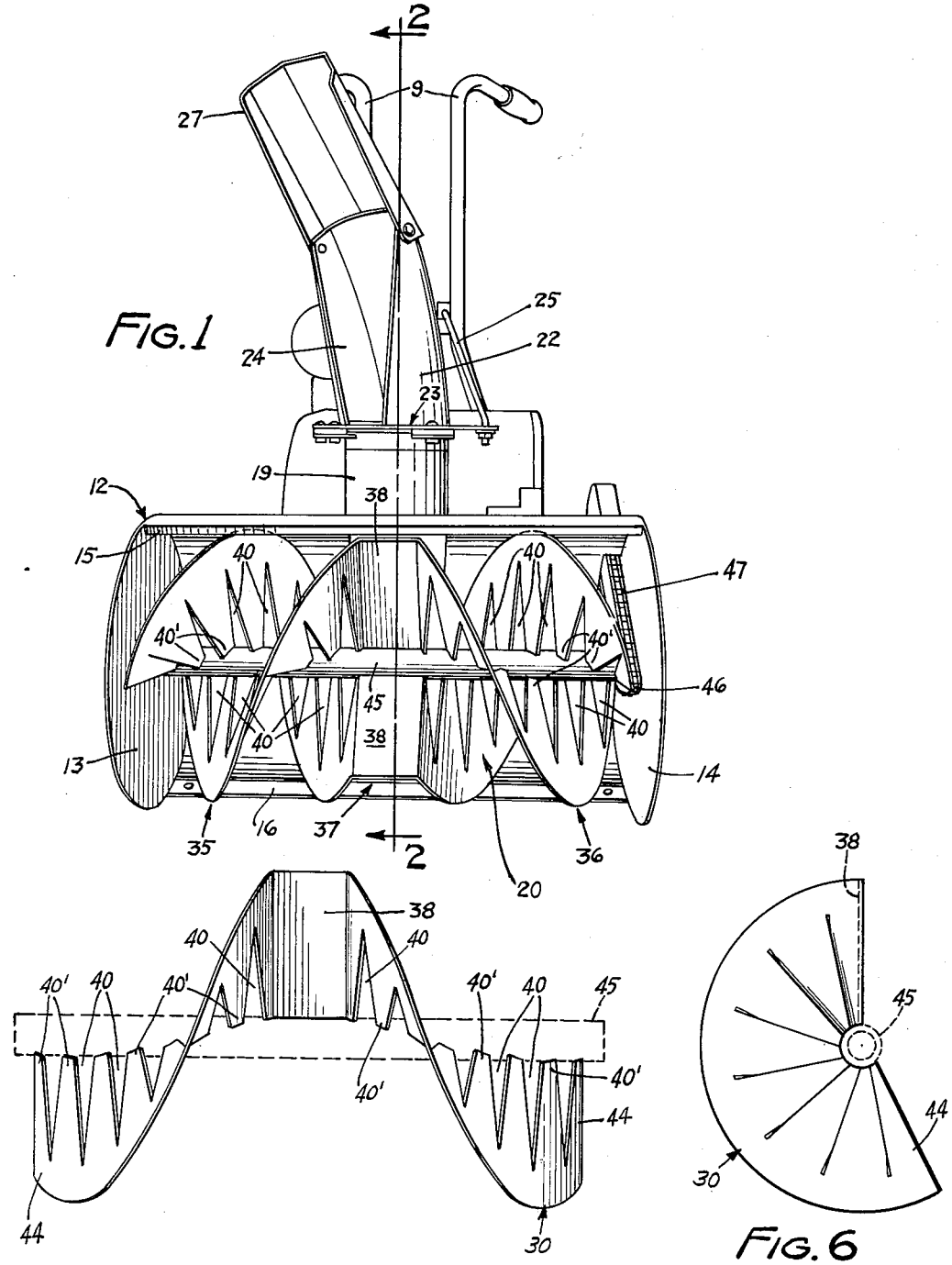

INVENTORS
WILLIAM F. WANNER
BY ARCHIE O. WILLIAMSON
DUDLEY O. HALL

Paul, Morrenlugger
ATTORNEYS

INVENTOR.
WILLIAM F. WANNER
BY ARCHIE O. WILLIAMSON
DUDLEY O. HALL

ATTORNEYS

Feb. 21, 1956   W. F. WANNER ET AL   2,735,199
ROTARY SNOW PLOW

Filed Sept. 18, 1952   5 Sheets-Sheet 5

INVENTOR.
WILLIAM F. WANNER
BY ARCHIE O. WILLIAMSON
DUDLEY O. HALL

Paul, Moore&Rugger
ATTORNEYS

United States Patent Office 2,735,199
Patented Feb. 21, 1956

2,735,199

ROTARY SNOW PLOW

William F. Wanner, Archie O. Williamson, and Dudley O. Hall, Minneapolis, Minn., assignors to Wm. Bros Boiler & Manufacturing Co., Minneapolis, Minn., a corporation of Minnesota Application September 18, 1952, Serial No. 310,156

2 Claims. (Cl. 37—43)

This invention relates to new and useful improvements in rotary snow plows and, more particularly, to such a device which may be used as an attachment to be interchangeably connected to the power unit of a conventional lawn mower, or other power unit, where applicable, whereby such power units may be utilized for clearing walks, driveways, and the like of snow and ice during the winter season.

Rotary snow plows of various forms have become very popular in recent years, some utilizing an impeller mounted for rotation upon a horizontal axis disposed in the direction of travel, and others utilizing opposed spiral conveyors mounted for rotation on a horizontal axis disposed cross-wise of the power unit. These plows have proven satisfactory to a certain extent, particularly when operating in rather light snow. Experience, however, has shown that snow plows of the above type, now in common use, have not proven entirely satisfactory, particularly when operated in deep or heavy wet snow, because of their inherent tendency to become clogged, whereby they may be rendered completely inoperative.

The novel invention herein disclosed is the result of considerable experimental and research work in an attempt to produce a snow plow which may be operated in all kinds of snow without any possible danger of becoming clogged or rendered inoperative by accumulation of snow or slush on rotary snow gathering member thereof.

An important object of the present invention, therefore, is to provide a rotary snow removal device comprising oppositely disposed spiral conveyor sections having their inner ends spaced apart to provide a snow receiving passage therebetween into which the snow is delivered by said sections for disposal by a suitable receiving means, and each of said conveyor sections having means embodied in the central portion thereof for permitting snow and air to circulate therethrough during operation of the plow, thereby to produce a scouring or cleaning effect on the central portions of the conveyor sections to facilitate the inward movement of the snow and to eliminate the danger of snow accumulating on the central portions of said conveyor sections.

A further object of the invention is to provide a rotary snow removal member comprising oppositely disposed spiral sections mounted for rotation about a common axis and having an impeller or blower interposed between the inner ends thereof for receiving the snow and other material from said conveyor sections and delivering it into a suitable housing and discharge chute.

A further object of the invention is to provide a rotary snow plow comprising a plurality of spiral conveyor vanes nested together about an elongated supporting member and secured thereto to form a composite snow gathering unit comprising a plurality of opposed spiral conveyor vanes and a centrally disposed impeller or blower, and means being embodied in said unit for rendering it self-cleaning when in use.

A further and more specific object of the invention resides in the provision of a snow gathering rotor comprising a series of circumferentially spaced spiral vanes, each having a plurality of axially spaced snow and air circulating passages therein adjacent to the roots thereof, through which snow and air may circulate during operation of the apparatus, thereby to thoroughly aerate the snow so that it may readily be blown upwardly through the discharge chute for suitable disposal by the action of the impeller, without any possible danger of the snow becoming clogged in the apparatus.

A further object resides in the specific construction of the spiral conveyor elements or flutes of the rotor, which are constructed of a plurality of independently formed elements each comprising a pair of opposed spiral vanes and an impeller blade, said opposed spiral vanes and impeller blade being formed from a single blank of sheet metal having an enlarged opening in its center, and the end portions thereof being radially slitted from said opening to points spaced inwardly from the peripheral edges of said end portions, whereby said slitted end portions may be outwardly drawn in opposed directions to form an elongated conveyor element, comprising opposed spiral vanes having their inner ends attached to a radial blade portion adapted to cooperate with the corresponding blade portions of other spiral conveyor elements of a given rotor, thereby to provide an integral centrally disposed impeller.

Other objects of the invention reside in the unique construction of the opposed spiral conveyor elements or vanes of the rotor, and particularly, in the radial slitting of the inner portions of said vanes whereby a plurality of circulatory openings or passages are provided therein through which air and a portion of the snow may circulate during operation of the apparatus, and the portions of said vanes providing, in effect, a plurality of axially spaced conveyor elements which co-operate with said vanes to move the snow and ice inwardly into the impeller and to minimize the accumulation of snow in the rotor; in the means provided for rotatively supporting the upper portion of the snow receiving housing whereby it may be conveniently rotated about an upright axis to control the directional flow of the snow from the plow; and in the simple and inexpensive construction of the rotor or snow engaging member, whereby it may be manufactured in quantity production at low cost, and in the simple and inexpensive construction of the attachment, as a whole, which readily lends itself for coupling to the power unit of a conventional lawn mower, whereby said power unit may be utilized for plowing snow during the winter season and for cutting grass and the like during the summer season.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a front view of the novel snow plow attachment herein disclosed, showing the unique construction of the rotor;

Figure 2 is an end elevation of the attachment detached from the mower unit;

Figure 3 is a view showing the contour of the blank from which the spiral conveyor elements are formed;

Figure 4 is a view showing the first step in the formation of the opposed spiral vanes of a conveyor element whereby the two end portions of the blank are bent along spaced parallel bend lines, indicated in Figure 3, to define the impeller blade therebetween;

Figure 8:
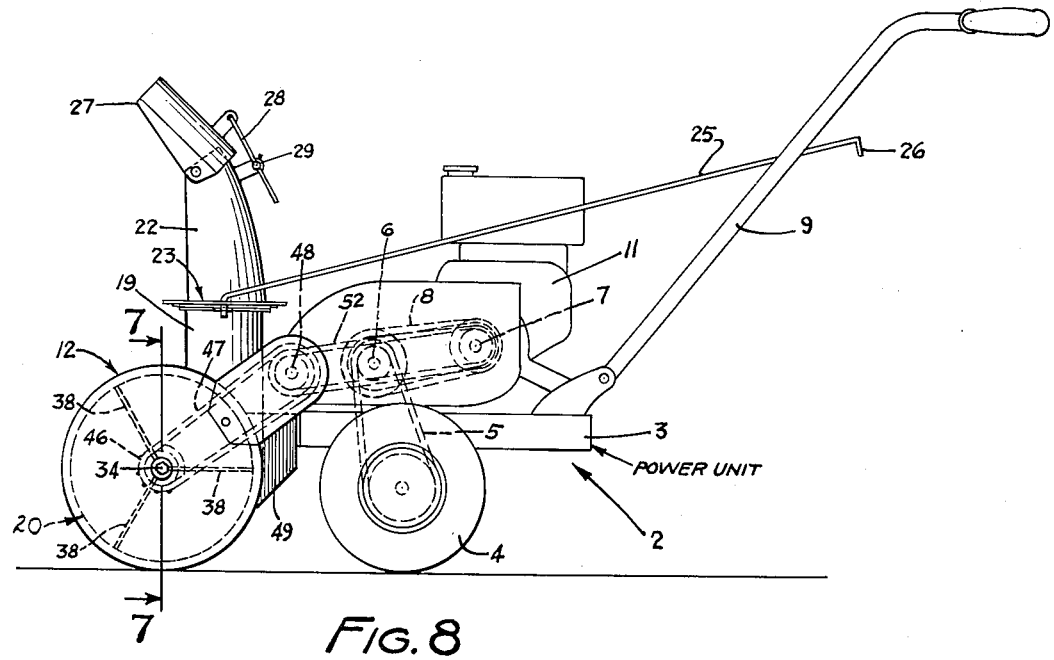
Figure 7:
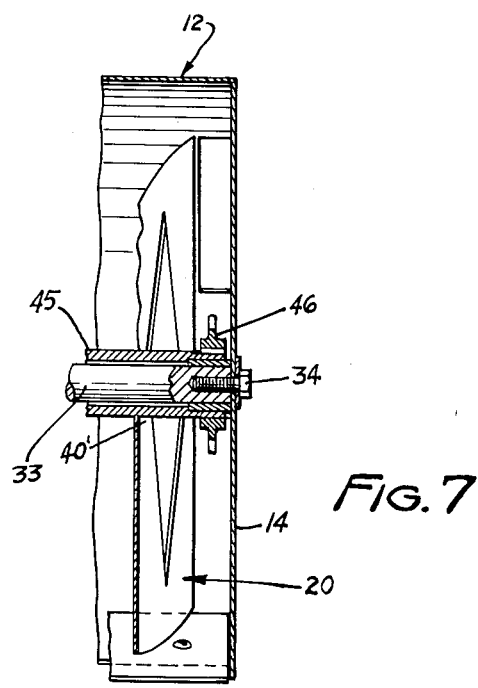
Figure 9:
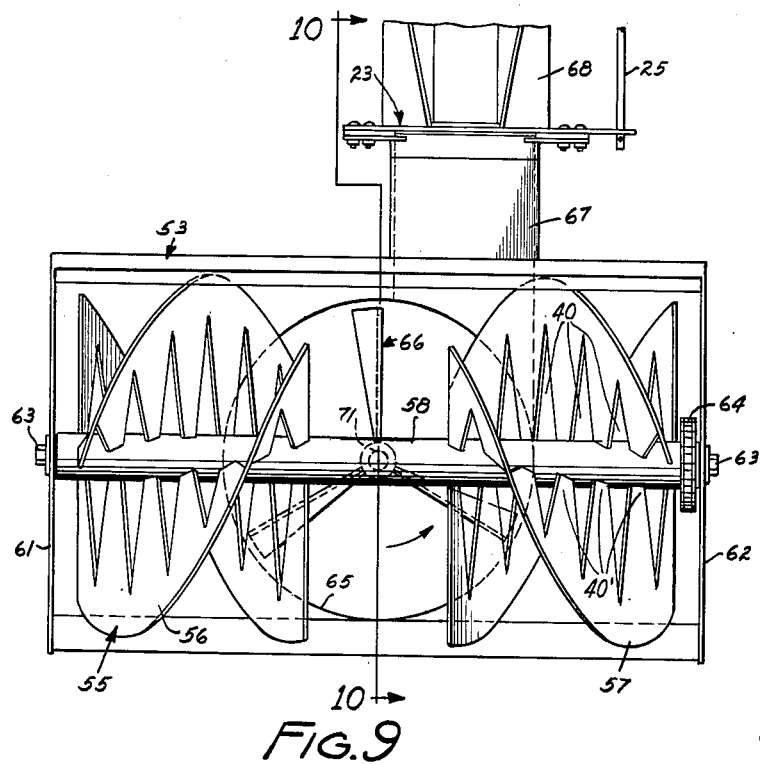
Figure 10:
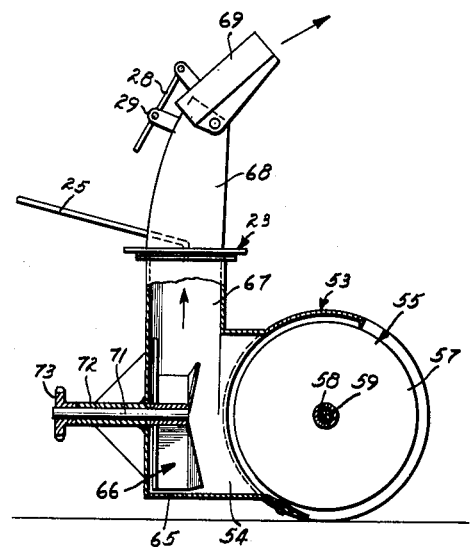
Figure 11:
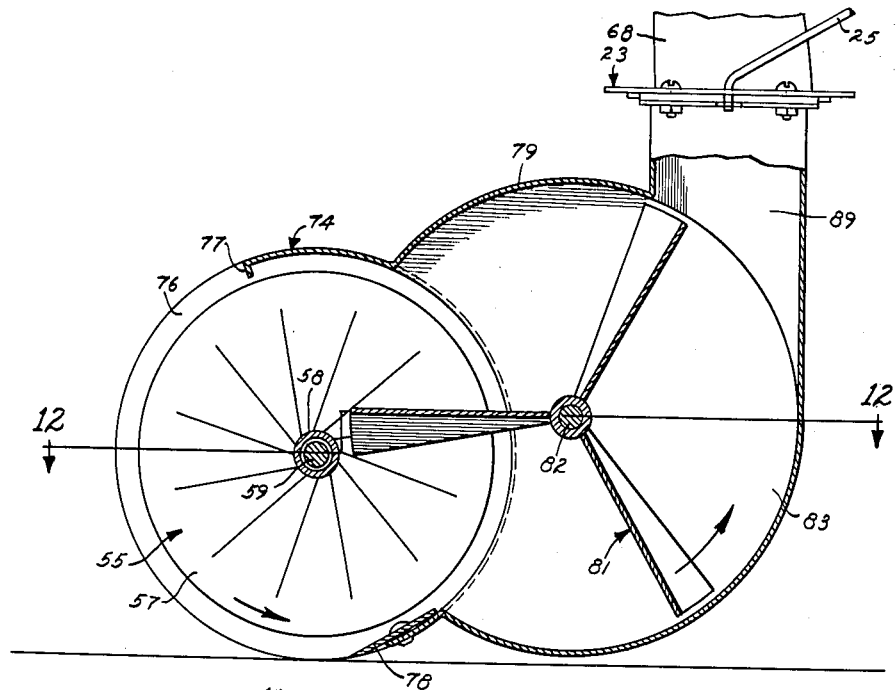
Figure 12:
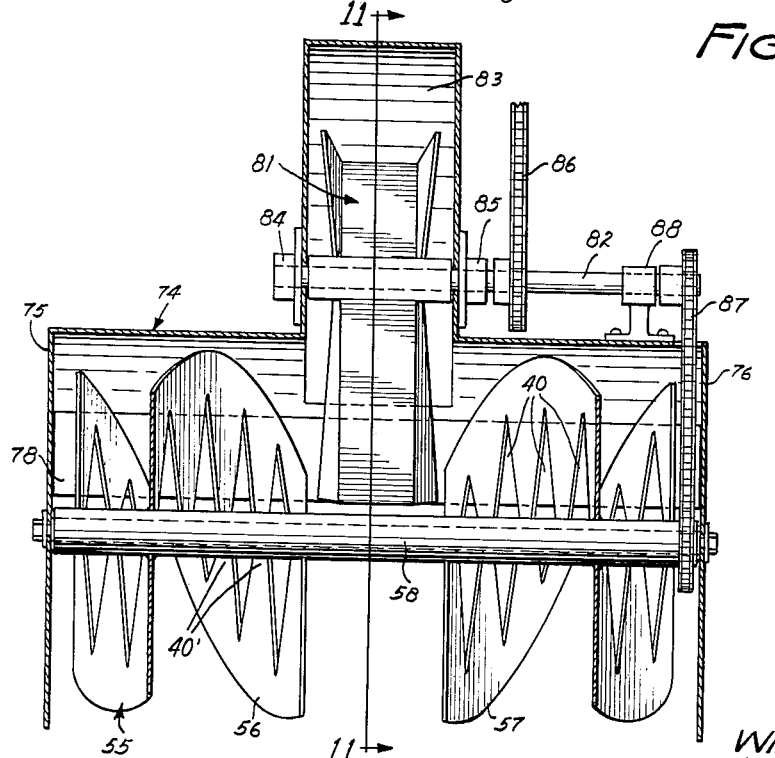

Figure 5 is a view showing the slitted end portions of the blank pulled outwardly to the full length of the rotor, wherein the radial slits shown in the blank in Figure 3, are opened up at their inner ends to provide a plurality of radially disposed openings or passages, the portions of the blank lying between adjacent openings forming, in effect, a plurality of axially spaced blades which cooperate to move the snow inwardly along the axis of the rotor;

Figure 6 is an end view of Figure 5;

Figure 7 is a fragmentary detailed sectional view substantially on the line 7—7 of Figure 8;

Figure 8 is a view showing the novel snow plow attachment herein disclosed operatively connected to the power unit of a conventional power lawn mower;

Figure 9 is a front view of a snow plow of slightly modified construction, wherein the impeller, shown in the previous figures, has been omitted from the rotor, and in lieu thereof an impeller is mounted in a housing disposed rearwardly of the rotor into which the snow and ice picked up by the opposed rotor sections is delivered by the forward movement of the plow when in use;

Figure 10 is a vertical sectional view on the line 10—10 of Figure 9;

Figure 11 is a vertical sectional view on the line 11 of Figure 12, showing a construction wherein the impeller is rearwardly of the rotor on an axis disposed in parallel relation to the axis of the rotor; and Figure 12 is a sectional plan view on the line 12—12 of Figure 11.

In the selected embodiment of the invention herein disclosed, there is illustrated in Figure 8, the power unit of a conventional lawn mower, generally designated by the numeral 2. The power unit is shown comprising a frame 3 mounted upon suitable traction wheels 4 having a chain drive 5 connecting it to a clutch shaft 6 driven from the engine crank shaft 7 by a flexible drive 8. A pair of handles 9—9 are secured to the frame 3 for the convenience of the operator in guiding the apparatus over the ground.

An important feature of the present invention resides in the unique construction of the snow plow attachment which, as best illustrated in Figures 1 and 2, comprises a semi-cylindrical housing, generally designated by the numeral 12, having end walls 13 and 14. The upper forward end of the housing 12 has an elongated downwardly extending reinforcing flange 15 defining the upper edge of the snow-receiving opening in the front of the housing. A wear plate or bar 16 is shown detachably secured to the lower marginal edge 17 of the housing by such means as bolts 18 and constitutes the lower edge of the snow-receiving opening. Wear bar 16 is adapted to slide over the surface of the ground and direct snow and ice upwardly into the housing, as will be understood by reference to Figure 2. The housing 12 is shown provided with a centrally disposed upright discharge chute 19 which is tangentially disposed relative to the rotor, generally designated by the numeral 20.

The chute 19 of the housing 12 terminates at 21, and an upper chute section 22 is rotatively mounted on the upper end of the chute 19 by a suitable clamping device 23 indicated in Figures 1 and 2. The chute section 22 is preferably open at its front side, as shown at 24 in Figure 1, to permit a portion of the snow to be discharged therefrom, as the snow and ice is upwardly directed into the chute section 22 from the chute 19, when the plow is in use. An operating rod 25 has its forward end pivotally connected to the clamping device 23 of the chute, and has its opposite end slidably supported in a suitable guide secured to one of the operating handles 9 of the power unit. The rear end of the rod 25 is preferably provided with a hand grip 26 whereby the operator may conveniently manipulate the rod to control the directional flow or discharge of the snow from the chute.

A hood 27 is pivotally mounted on the chute section 22 and has one end of a rod 28 secured thereto which is slidably mounted in a clamping element 29 having a wing nut 31 for securing the rod 28 in adjusted position relative to the chute section 22. The rod 28 and the wing nut 31 provide means for pivotally adjusting the hood 27, as will readily be understood by reference to the full and dotted lines in Figure 2.

One of the outstanding features of the present invention resides in the novel construction of the rotor 20, mounted for rotation on a shaft 33 having its end portions secured to the end walls 13 and 14 of the housing 12 by suitable screws 34, as best illustrated in Figure 7. The rotor, as shown in Figure 1, is of the spiral conveyor type, and, in the present instance, comprises opposed spiral conveyor sections 35 and 36, which co-operate to convey snow and ice inwardly towards the center of the rotor, into engagement with an impeller, designated by the numeral 37.

The rotor 20, as shown in Figures 1 and 2, is formed of three spiral conveyor blades 30 shown in Figures 5 and 6, nested together so that each of the conveyor sections 35 and 36 comprises triple spirals. These spirals terminate at the center of the rotor in circumferentially spaced radial blades 38 which co-operate to form a three-bladed impeller or blower, as clearly illustrated in Figure 2. In some instances it may be found desirable to increase or decrease the number of helical conveyor blades 30 utilized in a given rotor.

Each of the three spiral conveyor elements 30 is formed from a single blank 39 of sheet metal configurated as illustrated in Figure 3. The blank has an elongated centrally disposed opening 41 therein which communicates with one end of a radial opening 42 extending from the opening 41 to the periphery of the blank. The opposed walls of the opening 42 are preferably slightly inclined, as shown in Figure 3 of the drawings. At the opposite side of the blank from the opening 42 a pair of spaced parallel bend lines 43 are provided in the upper portion of the blank when viewed as shown in Figure 3 to facilitate bending the blank to form the impeller blade 38.

Another important feature of the invention resides in the unique manner in which the blank is slitted. By referring to Figure 3 it will be noted that each end portion of the blank is radially slitted from the opening 41 to a location spaced inwardly from the outer marginal edge of the blank. These slits constitute an important feature of the invention in that when the end portions 44—44 of the blank are subsequently outwardly drawn or extended in opposite directions, as shown in Figure 5, the opposed walls of each slit are separated from one another to provide a plurality of radial openings or passages 40 thru which air and a portion of the snow and ice engaged by the rotor may pass. It will also be noted that when the blank is extended or elongated, as shown in Figure 5, a plurality of blade-like elements 40' are formed between the radial openings or passages 40 which have their inner terminals seated against and secured to the periphery of a tubular member 45, whereby the spiral vanes of the three conveyor elements 30 and the tubular member 45 become, in effect, an integral structure.

Before the slitted end portions of the blank are extended outwardly to the form shown in Figure 5, the blank is bent along the bend lines 43 by suitable dies to substantially the form shown in Figure 4, thereby to form the radial blade portion 38 of the impeller. As hereinbefore stated, the composite rotor 32 as herein shown, comprises triple conveyor elements 30 which are so nested together as to provide the composite rotor illustrated in Figures 1 and 2.

A sprocket 46 is shown secured to one end of the tubular member 45 of the rotor and has a chain drive 47 operatively connecting it to a countershaft 48 mounted upon a rearward extension 49 of the rotor housing 12.

The shaft 48 is driven from the engine shaft 7 by a flexible drive 52.

The radial slitting of the blank as above described provides a very simple and inexpensive method of forming the vent openings 40 at the center of the rotor. By thus constructing the rotor, a portion of the snow and ice engaged by the rotor is continually passing thru the openings 40 therein, and at the same time air may circulate thru said openings and thereby thoroughly aerate the snow so that it may readily be thrown upwardly through the chute 19—22 in a trajectory path, by the rotary action of the rotor 32.

By permitting air and a portion of the snow to pass through the triangular openings 40 in the rotor vanes, the blade-like elements 40' may freely operate on the snow delivered into the center of the rotor and thus quickly convey such snow inwardly to the center of the apparatus, thereby to be engaged by the impeller blades 38 and thrown upwardly by centrifugal force through the chute 19, and outwardly through the hood 27 in a trajectory path, as will be readily understood by reference to Figure 2 in which the arrows indicate the path of travel of the snow. The openings 40 and the blade elements 40' thus cooperate to eliminate all danger of a portion of the snow accumulating in the central portion of the rotor and reducing its efficiency.

In operation, the apparatus, when viewed as shown in Figure 8, is propelled forwardly into the snow whereby the opposed spiral conveyor sections 35 and 36 engage and inwardly convey the snow to the central discharge chute 19, which directs the snow and ice upwardly into the hood 27 which, in turn, directs the snow to either side of the plow, or forwardly, controlled by the positioning of the pivoted section 22 by manipulation of the control rod 25.

If the snow is very deep, it is conveyed inwardly by the marginal edges of the spirals of the opposed conveyor sections 35 and 36 and is there picked up by the impeller and discharged into the chute 19. Should the snow be rather deep, a portion thereof may pass through the openings or passages 40 in the rotor which, with the flow of air therethrough, will effect a scouring and cleaning action which will prevent snow from accumulating in the center of the rotor, which might eventually completely clog the rotor. By thus permitting air and a portion of snow to pass through the openings 44 in the rotor, the snow also becomes thoroughly agitated within the housing 12 and is so aerated that it is readily thrown upwardly thru the discharge chute 19 by the centrifugal action of the rotor, assisted by the velocity of the air current passing upwardly therethrough. The blade-like elements 40' between the slots 40 also act to disintegrate all large chunks of ice and snow which may enter into the rotor, whereby such hardened chunks or particles may readily be carried upwardly through the chute 19 by the action of the impeller, as will be understood.

In Figures 9 and 10, there is illustrated an apparatus of slightly modified construction comprising a housing 53 which is somewhat similar to the housing 12, shown in the previous figures, except that it is provided at its rear central portion with a receiving chamber 54 shown in direct communication with the housing 53 to receive snow therefrom as will be understood.

A rotor, generally designated by the numeral 55, is rotatively mounted within the housing 53 and, like the rotor 20 in Figure 1, comprises oppositely disposed spiral conveyor sections 56 and 57 having their inner ends spaced apart to provide a passage therebetween for receiving snow conveyed inwardly by the conveyor sections 56 and 57. The spiral conveyor sections are shown fixed to an elongated supporting member 58, similar to the member 45 of the preceding figures. The member 58 is rotatively mounted on a shaft secured in the end walls 61 and 62 of the housing by suitable bolts 63. The rotor 55 may be driven from the engine of the power unit by a suitable flexible drive, indicated at 64 in Figure 9.

The receiving chamber 54 of the housing 53 is formed by a rearward extension 65 of the housing 53, and has an impeller 66 mounted therein for discharging the snow from the chamber 54 to the atmosphere through a chute 67. The chute 67 has an upper section 68 rotatively mounted thereon, which adjustably carries a snow-directing hood 69, similar to the one illustrated in Figures 1 and 2.

In the operation of the apparatus illustrated in Figures 9 and 10, the snow enters the opening provided in the front of the housing 53, as the apparatus is moved forwardly into the snow by the power unit. The forward movement of the housing 53 causes the snow to enter the chamber 54 where it is engaged by the impeller 66 and thrown upwardly through the chute sections 67 and 68 by the centrifugal action of the impeller, as will readily be understood by reference to Figures 9 and 10. The impeller 66 is shown secured to a shaft 71 mounted in a bearing 72 and having means such as a sprocket 73 at its rear end, whereby it may be connected to a source of power such as the engine of the power unit.

In Figures 11 and 12 there is shown an apparatus comprising a rotor 55, similar to the rotor shown in Figures 9 and 10, mounted in a housing 74 having end walls 75 and 76 provided at its forward end with a receiving opening defined by the upper depending flange 77 and the wear plate or bar 78 at the bottom of the housing.

The housing 74 is provided at its central portion with a rearwardly extending cylindrical casing 79, the axis of which is substantially parallel to the axis of the rotor 55. An impeller, generally designated by the numeral 81, is mounted on a shaft 82 within the chamber 83, defined by the walls of the casing 79. The shaft 82 is shown mounted in suitable bearings 84 and 85 secured to the end walls of the casing 79 and may be driven by a flexible drive, indicated at 86. A similar drive 87 operatively connects the outer end of the shaft 82 to the supporting member 58 of the rotor 55, whereby the rotor is driven simultaneously with the impeller 81. The outer end of shaft 82 may be provided with an auxiliary bearing 88, shown in Figure 12.

It will also be noted by reference to Figure 11 that the casing 79 has an upright discharge chute 89, similar to the chute 67 of Figures 9 and 10, through which the material is directed for disposal by the rotary action of the impeller 81.

In the operation of the apparatus shown in Figures 11 and 12 the snow engaged by the spiral conveyor sections 56 and 57 of the rotor is conveyed inwardly into the path of the impeller 81, when the apparatus is moved forwardly into a mass of snow. As the snow enters the impeller chamber 83, the impeller picks up the snow and drives it upwardly through the chute 89 to be discharged from the upper end of the chute 89, as hereinbefore stated. The openings 40 in the central portion of the spiral vanes of the two conveyor sections 56 and 57, effect a thorough agitation of the snow along the central portion of the conveyor sections, whereby the snow is constantly agitated and aerated which greatly facilitates the removal of the snow from the chamber 83 by the action of the impeller 81.

The novel rotor featured in the present invention is self-cleaning, regardless of the inherent nature of the snow. As hereinbefore stated, the blade-like elements 40' disposed between the openings or slots 40, function to continually axially direct the snow and ice toward the center of the rotor and, in connection with the openings 40, develop an air turbulence within the housing which so thoroughly disintegrates the snow that it may readily be directed into the discharge chute by the impeller, assisted by the velocity of the air flow induced in the discharge chute by the rotary action of the impeller.

The foregoing detailed description has been given for

We claim as our invention:

1. In combination with a snow plow including, an elongated transverse housing having a central discharge opening, a rotor mounted in said housing and comprising an elongated centrally disposed member having right and left-hand spiral vanes mounted thereon for conveying snow inwardly to said discharge opening, said right and left-hand spiral vanes having their inner edges slitted to provide a plurality of radial air-circulating passages in said vanes which gradually diminish in size in an outward direction, the relatively larger inner portions of said air-circulating passages permitting snow and air to circulate therethrough and thus prevent the accumulation of snow and other matter at the center of the rotor, when the plow is in operation.

2. A rotor according to claim 1, wherein the portions of said spiral vanes which separate said air-circulating passages from one another form inwardly tapering blade-like elements adapted to engage and axially direct snow delivered into the center of the rotor.

References Cited in the file of this patent

UNITED STATES PATENTS

| | | | |
|---|---|---|---|
| Re. 6,856 | Chase et al. | Jan. 11, | 1876 |
| 1,422,972 | Henry | July 18, | 1922 |
| 1,738,994 | Gredell | Dec. 10, | 1929 |
| 2,046,988 | Winter | July 7, | 1936 |
| 2,200,623 | James | May 14, | 1940 |
| 2,387,422 | Venable | Oct. 23, | 1945 |
| 2,387,423 | Venable | Oct. 23, | 1945 |
| 2,587,415 | Vanvick | Feb. 26, | 1952 |
| 2,610,414 | Vanvick | Sept. 16, | 1952 |
| 2,653,701 | Heth | Sept. 29, | 1953 |

FOREIGN PATENTS

| | | | |
|---|---|---|---|
| 207,053 | Switzerland | Dec. 1, | 1939 |
| 224,578 | Switzerland | Apr. 1, | 1943 |